Feb. 18, 1958 F. B. DANIELS 2,823,974
FLASH-TO-SOUND RECORDING SYSTEM
Filed Oct. 3, 1944
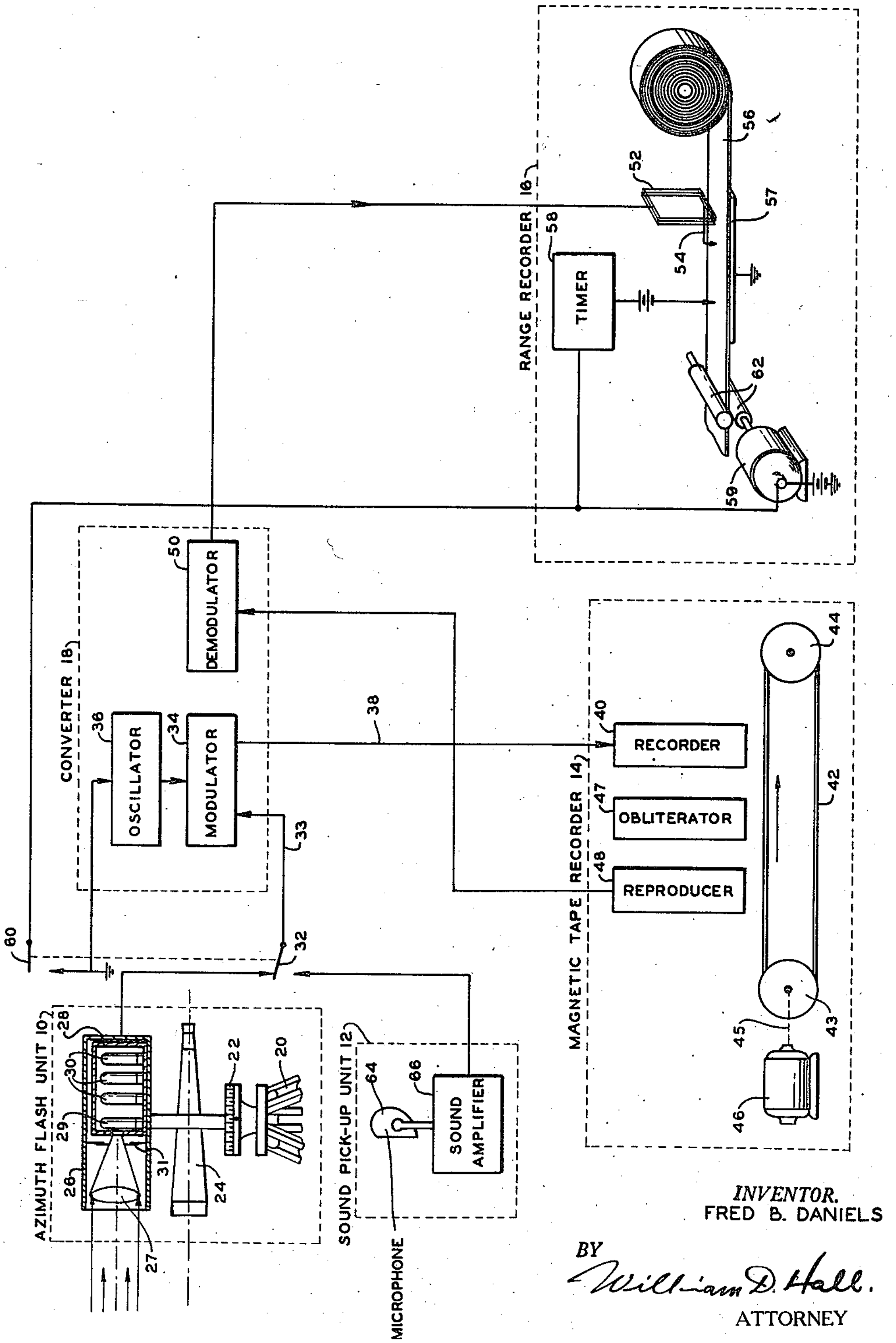
INVENTOR.
FRED B. DANIELS
BY William D. Hall.
ATTORNEY

United States Patent Office 2,823,974

Patented Feb. 18, 1958

2,823,974

FLASH-TO-SOUND RECORDING SYSTEM

Fred B. Daniels, New York, N. Y., assignor to the United States of America as represented by the Secretary of War Application October 3, 1944, Serial No. 557,052

1 Claim. (Cl. 346—34)

(Granted under Title 35, U. S. Code (1952), sec. 266)

The invention described herein may be manufactured and used by or for the Government for governmental purposes, without the payment to me of any royalty thereon.

This invention relates to a method and apparatus for obtaining range and azimuth of substantially instantaneous flashes of light accompanied with the simultaneous emission of sound. Examples of such simultaneous flashes and sound are enemy guns and shells from friendly artillery when the shells and the guns are such as to produce visible flashes of light. Although the invention discloses an apparatus for obtaining the azimuth as well as the range of the flash and sound producing guns, the invention itself relates to the improvements in the flash-to-sound range determining apparatus. The method consists of recording the flash, measuring the time between the occurrence of flash and the arrival of sound, and converting the measured time into linear distance, or range, by multiplying the time by the known velocity of sound.

The difficulty with the aforementioned method of measuring range resides in the fact that it requires continuous operation of the recording apparatus, and since in many instances the observations may extend over a period of at least many hours, if not days, the recorders require enormous quantities of recording tape which is continuously used up during the long periods of observation. Such uneconomical use of the recording tape, besides the expense, often caught the recorders without any tape because of frequent interruptions for inserting new rolls of tape.

The invention provides an effective solution to the above mentioned problem by using the range recorder and its expendable recording tape only during the actual flash and range observation periods, i. e. the range recorder is started simultaneously or shortly after the occurrence of flash, let run until the arrival of sound, and stopped again thereafter; the actual continuous flash observations are performed by using an endless loop of magnetic tape of a magnetic recorder, the tape being continuously restored to its original state by an obliterator.

To accomplish this result, the magnetic tape recorder is interposed between a photo-electric unit used for observing the flashes and the ranger recorder, the range recorder being normally inoperative while the magnetic tape recorder is running continuously and is normally connected to the photo-electric unit for recording the flashes picked up by the photo-unit. The magnetic tape recorder is provided with a magnetic recorder, a reproducer and an obliterator, the reproducer being permanently connected to the range recorder. Since the magnetic tape recorder uses a closed loop of magnetic wire for recording the flashes, it is obvious that continuous operation of the magnetic recorder does not introduce any difficulties from the point of view of excessive use of materials, such as expendable, chemically sensitized recording tape used in the range recorder, since the magnetic wire-loop may be used over and over again for any length of time because the obliterator continuously restores the tape to its normal demagnetized state. Switches are interposed between the photo-electric unit and a sound pick-up unit which disconnect the photo-electric unit from the magnetic tape recorder and connect the recorder to the sound unit after the desired flash has been recorded on the magnetic tape. The same switches are also used for starting the range recorder so that when the magnetic tape reproducer picks up the recorded flash from the magnetic tape, the recorder is already in operating condition and is ready to receive and properly record the flash reproduced after some time-delay by the magnetic tape. Time intervals are also recorded on the tape of the range recorder by means of a timer so that when sound reaches the range recorder, the flash-to-sound time record appears on the tape.

From the description of the flash-to-sound recorder given thus far, it follows that the function performed by the magnetic tape recorder is to act as a ready means for recording any flashes that may occur at any time on an endless magnetic loop, and for storing it for a sufficient length of time to allow the operator to start the range recorder and to put it into fully operative condition before the magnetic tape reproducer impresses the flash on the range recorder. From then on the range recorder remains in operation until the arrival of the sound, thus recording the desired time interval, whereupon it is stopped once more restoring the normal flash recording position of the system.

It is, therefore, the principal object of this invention to provide a flash-to-sound recorder with a temporary record storing means between the pick-up instruments and the range recorder for making it possible to operate the range recorder only during the actual flash-to-sound time recording periods.

An additional object of this invention is to provide a flash-to-sound recorder which is provided with proper instrumentalities for scanning the available field with the aid of a magnetic recorder while the range recorder is stationary, and for transferring the entire flash-to-sound record from the magnetic tape to the range recorder for producing a permanent time record.

Still an additional object of this invention is to provide a flash-to-sound recorder which uses a magnetic tape for continuous scanning of the selected field and temporary recording of flash and sound, and an expendable tape for producing permanent flash-to-sound record, the accuracy of the results being determined substantially by the permanent record only.

The novel features which I believe to be characteristic of my invention are set forth with particularity in the appended claim. My invention itself, however, both as to its organization and method of operation, together with further objects and advantages thereof, may best be understood by references to the following description taken in connection with the single figure of the accompanying drawing.

Referring now to the drawing, the azimuth and flash unit 10 is illustrated in the upper left portion of the diagram, the sound pick-up unit 12 is directly below the former, the magnetic recorder 14 appears in the lower left corner, the range recorder 16 is in the lower right corner, and a converter 18 is illustrated in the upper right corner of the diagram. The azimuth and flash unit consists of a tripod 20 equipped with an azimuth dial 22, an azimuth telescope 24, and a flash unit 26, the latter including a lens 27, and a photo-electric cell unit 28 consisting of a photo-electric cell 29 and a multistage amplifier 30. The optical axis of telescope 24 and of lens 27 are carefully aligned so that the two point in the same azimuth direction. The lens has a limited field of view so that a circular field, for example in the order of 60 mils (3.4°), is imaged on the photo-electric cell for night operation, and apertures 31 are used for reducing this field to a rectangular field of 60 mils horizontally, and 10 mils vertically for daytime use. The photo-electric cell 29 may be of vacuum or gas filled type having proper spectral sensitivity and capable of reproducing fast light changes without undue distortion and delay. The multistage photo-electric cell amplifier 30 may be a resistance-coupled amplifier with a frequency response appropriate to the flash being recorded. A range of from 5–100 C. P. S. has been found to be suitable. The optical axis of the flash and azimuth unit is pointed by the operator in the direction of the expected flashes, and the azimuth of the flashes is determined by observing them through telescope 24. The latter is provided with a reticule which is used by the operator for noticing the azimuth position of the maximum intensity of illumination with respect to the reticule in the field of the azimuth telescope 24, and combining the reticule reading with the reading appearing on the azimuth dial 22.

The same flash is picked up by the condenser lens 27 and is impressed on the photo-electric cell 29 and amplifier 30, whereupon it is impressed on switch 32, conductor 33 and a modulator 34. An audio frequency oscillator 36 impresses its output on modulator 34 where it is modulated by the signal impressed upon it by conductor 33 when photo-electric cell 29 becomes conductive. An audio frequency pulse appears in the output of the modulator, and this is impressed on a conductor 38 which conveys it to a magnetic recorder 40 for recording it on a magnetic tape 42. The magnetic tape may represent a single, welded loop of magnetic tape or wire or preferably a plurality, such as 20 or 30, turns of tape mounted on a drum. The magnetic recorder 14 therefore consists of recorder 40, magnetic loop 42 mounted on pulleys 43 and 44, one of the pulleys being connected by means of a shaft 45 to a motor 46; the motor revolves the magnetic tape continuously around the pulleys in the direction indicated by the arrow. In addition to recorder 40 there are also an obliterator 47 and a reproducer 48, the obliterator leading the recorder and the reproducer leading the obliterator, as illustrated in the figure. The three units are preferably mounted next to each other so that practically the entire length of the magnetic tape is used for delaying the reproduction of the recorded signal. The functioning of the magnetic recorder is self-evident from the illustrated diagram, the signals to be recorded on the tape are impressed on recorder 40, and after the tape carrying the recorded signal has completed practically one revolution around the pulleys 44 and 43, it appears under reproducer 48 which picks up the recorded signal and impresses it on a demodulator 50; thereupon the tape passes under the obliterator, which consists of a plurality of magnets or any other known "erasing" method for removing the recorded signal from the tape and preparing it once more for its use with the recorder 40.

The range recorder 16 consists of a galvanometer 52 provided with a recording arm 54, a current sensitive tape 56 (such as "Teledeltos"), a grounded metal plate 57, a timer 58, a motor 59, and rollers 62 connected to motor 59 for pulling tape 56 at uniform speed past the galvanometer arm 54 and timer 58. Normally the range recorder is at a standstill because switch 60 is normally in open position. When the operator observes the flash in telescope 24 he at once operates the switches 32—60. Since there is normally a delay of 0.3 second between the observation of the flash and the operation of the switches, and since the duration of the gun flashes is ordinarily in the order of from 0.03 to 0.06 second, it follows that the flash will be recorded on the magnetic tape 42 before the operator disconnects the flash unit 26 from the magnetic tape recorder. The length of the wire loop 42 as well as the inertia of the parts in the range recorder 16 are so adjusted that sufficient time elapses between the instant of recording the flash on the magnetic tape and its reproduction by the reproducer 48 for the range unit to come up to full speed and be ready to receive and record the flash as impressed upon it by the reproducer 48. Operation of the switches 32 and 60 also energizes timer 58 so that proper time markings are produced on the tape by the timer. Upon transferring of the flash signal from tape 42 to tape 56, the accuracy of the range determinations depends on the accuracy of timer 58, and is independent of any slippage or asynchronism between the magnetic tape 42 and the current sensitive tape 56. Ordinarily several revoluations of the magnetic tape take place between the arrival of the flash and the arrival and recording of sound on the tape. The sound is picked up by the sound pick-up unit 12, consisting of a microphone 64 and a sound amplifier 66; as in the case of flash, the sound is impressed on modulator 34 and recorder 40 which records it on magnetic tape 42; it is then picked up by reproducer 48 and is recorded on tape 56 by galvanometer 52 upon its demodulation by demodulator 50. As mentioned previously, the range is determined by counting the number of markings produced by marker 58 on tape 56, and after the time between the arrival of flash and the arrival of sound is determined, the distance is obtained by multiplying the known time by the velocity of sound. It is obvious that the time consumed by the travel of light from the source of light to the point of observation is instantaneous for the purpose at hand, and does not introduce any measurable error.

The advantages of the flash-to-sound recorder described in the specification should be apparent to anyone skilled in the art. The difficulties of maintaining the range recorder continuously supplied with the tape when the range recorder itself is used during the observational periods is very well known to those who operated and used the recorders of this type. The invention not only simplifies the operating characteristics of the system, but it also improves its reliability since the idle periods of the range recorder, which take place when new rolls of tape must be inserted in the recorder, have been diminished to a very large extent.

The invention discloses manual means for operating the switches upon the reception of the flash. Experience has indicated that such switching arrangement is simple, reliable, and does not offer any difficulties in the field. In some instances, when it becomes necessary to choose some specific flash from a plurality of flashes, the manual system obviously offers definite advantages since any flash may be selected by the operater at his will. However, uses may be encountered where the manual switching may be undesirable, and when this is the case, automatic switching upon the reception of flash may be used. In the latter case the switching relays, or relay, must derive the power from the photo-electric cell amplifier, and the relays must have sufficient time delays for allowing the flash to be recorded in proper manner on the magnetic tape. The range recorder 16 has been illustrated as of the type which uses current sensitive tape for accomplishing its function. It is obvious that any other type of recorders may be used, such as photographic film or magnetic tape recorders, although the recorders of this type may obviously introduce additional unnecessary complications. The magnetic recorder 14, and especially tape 42, is illustrated as a single loop of tape mounted on two pulleys 43 and 44. Better results are obtained when the magnetic tape consists of a plurality of turns, as mentioned previously in the specification, and, therefore, the showing of the magnetic tape recorder in the figure should be considered as only of a diagrammatic nature for sake of the simplicity of the drawing. No schematic diagrams of the circuits used in the photo-electric cell amplifier, sound amplifier, and converter are illustrated in the figures since their circuits are too well known to call for any specific illustration and description. The only requirement that must be kept in mind is that sufficient amplification should be used throughout in order to have proper sensitivity and signal-to-noise ratio in the system.

It is believed that the construction and operation of the illustrated recording system, as well as the many advantages thereof, will be apparent from the given description. It should be understood that while I have shown and described my invention in the preferred form, many changes and modifications may be made without departing from the spirit of the invention as sought to be defined in the following claim.

I claim:

A flash-to-sound recording system for determining range between a source of flash and sound and said system, said system including a flash pick-up system pointing in the direction of anticipated flash, said pick-up system including a photo-electric cell and its amplifier, a modulator connected to said amplifier, an oscillator connected to said modulator, the frequency of said modulator being adjusted to act as a carrier for a signal impressed on said modulator by said amplifier, an endless magnetic tape recorder including magnetic head recorder, reproducer and obliterator, said recorder being connected to the output of said modulator, a range recording means including a range recorder, a timer and a motor for moving a recording medium of said recorder, a sound pick-up unit, and a switch for disconnecting the photo-electric cell amplifier from said modulator and for connecting said sound pick-up unit to said modulator and for simultaneously starting said motor and said timer for recording timing signals on said recording medium and for transferring the flash and sound signals from said magnetic tape on said recording medium, whereby the range can be determined solely from the number of timer markings between the flash and sound signals all appearing on said medium.

References Cited in the file of this patent

UNITED STATES PATENTS

| | | |
|---|---|---|
| 1,677,944 | Williams | July 4, 1928 |
| 2,132,225 | Subrizi | Oct. 4, 1938 |
| 2,253,975 | Guavella | Aug. 26, 1941 |
| 2,298,608 | Bates | Oct. 13, 1942 |
| 2,326,880 | Norrman | Aug. 17, 1943 |
| 2,370,133 | Begum | Feb. 27, 1945 |